US010853554B2

(12) United States Patent
Turek et al.

(10) Patent No.: US 10,853,554 B2
(45) Date of Patent: Dec. 1, 2020

(54) SYSTEMS AND METHODS FOR DETERMINING A CONFIGURATION FOR A MICROARCHITECTURE

(71) Applicant: Intel Corporation, Santa Clara, CA (US)

(72) Inventors: Javier Sebastian Turek, Beaverton, OR (US); Javier Felip Leon, Hillsboro, OR (US); Alexander Heinecke, San Jose, CA (US); Evangelos Georganas, San Mateo, CA (US); Luis Carlos Maria Remis, Hillsboro, OR (US); Ignacio Javier Alvarez, Portland, OR (US); David Israel Gonzalez Aguirre, Hillsboro, OR (US); Shengtian Zhou, Palo Alto, CA (US); Justin Gottschlich, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/456,825

(22) Filed: Jun. 28, 2019

(65) Prior Publication Data
US 2019/0325108 A1 Oct. 24, 2019

(51) Int. Cl.
G06F 30/30 (2020.01)
G06F 30/398 (2020.01)
(Continued)

(52) U.S. Cl.
CPC ............ *G06F 30/398* (2020.01); *G06N 3/04* (2013.01); *G06N 3/08* (2013.01)

(58) Field of Classification Search
CPC ... H01L 2924/1305; H01L 2924/13062; H01L 2924/13091; H01L 27/10894;
(Continued)

(56) References Cited

U.S. PATENT DOCUMENTS

| 7,617,470 B1 * | 11/2009 | Dehon | G06F 30/3312 716/116 |
| 2002/0002698 A1 * | 1/2002 | Hekmatpour | G06F 11/263 716/106 |
| 2004/0243964 A1 * | 12/2004 | McElvain | G06F 30/392 716/112 |

OTHER PUBLICATIONS

Tpek, Engin et al., Efficiently Exploring Architectural Design Spaces via Predictive Modeling, vol. 41, No. 11. ACM, 2006, 12 pages.

(Continued)

Primary Examiner — Binh C Tat
(74) Attorney, Agent, or Firm — Hanley, Flight & Zimmerman, LLC

(57) ABSTRACT

Systems and methods for determining a configuration for a microarchitecture are described herein. An example system includes a proposal generator to generate a first candidate configuration of parameters for the microarchitecture, a machine learning model to process the first candidate configuration of parameters to output estimated performance indicators for the microarchitecture, an uncertainty checker to determine whether the estimated performance indicators are reliable, and a performance checker. In response to a determination that the estimated performance indicators are reliable, the performance checker is to determine whether the estimated performance indicators have improved toward a target. Further, if the estimated performance indicators have improved, the performance checker is to store the first candidate configuration of parameters in a memory as a potential solution for a microarchitecture without performing a full simulation on the first candidate configuration of parameters.

20 Claims, 5 Drawing Sheets

(51) Int. Cl.
 *G06N 3/04* (2006.01)
 *G06N 3/08* (2006.01)
(58) Field of Classification Search
 CPC ........... H01L 27/112; H01L 2924/1306; H01L 29/78; H01L 21/268; H01L 29/7843; H01L 29/66795; A61B 5/14735; A61B 17/3468; G03F 9/7076; G03F 9/7084; G06F 9/30054; G06F 9/30101; G06F 9/3012; G06F 15/16; G06F 15/7832; G06F 15/80; G06F 15/8053; G06F 30/3312; G06F 30/34; G06F 8/40; G06F 9/30; G06F 9/30014; G06F 9/30018; G06F 9/30025; G06F 9/30029; G06F 9/30032; G06F 9/30036; G06F 9/3004; G06F 9/30043; G06F 9/30076; G06F 9/30087; G06F 9/30109; G06F 9/30112; G06F 9/30123; G06F 9/30145; G06F 9/3016; G06F 9/30167; G06F 9/355; G06F 9/3552; G06F 9/3816; G06F 9/3824; G06F 9/383; G06F 9/3851; G06F 9/3853; G06F 9/3861; G06F 9/3873; G06F 9/3885; G06F 9/3887; G06F 9/3891; G06F 16/137; G06F 16/9024; G06F 19/3418; G06F 2111/06; G06F 2111/08; G06F 30/327; G06F 30/392; G06F 30/398
 USPC ..................................................... 716/50–56
 See application file for complete search history.

(56) References Cited

OTHER PUBLICATIONS

Dubach, Christophe, "Using Machine-Learning to Efficiently Explore the Architecture/Compiler Co-Design Space", 2009, 165 pages.
Henning, John L., "SPEC CPU2006 benchmark descriptions", CM SIGARCH Computer Architecture News 34, No. 4 (2006): 1-17, 17 pages.
Standard Performance Evaluation Corporation, "SPEC Benchmarks—Published Results", retrieved from http://www.spec.org/results.html, last updated on Apr. 10, 2019, 7 pages.
Goodfellow, Ian et al., "Deep Learning", MIT Press, 2016, retrieved from http://www.deeplearningbook.org, 798 pages.
Neal, R. M., "Bayesian Learning for Neural Networks" (vol. 118), Springer Science & Business Media, 1995, 195 pages.
Gal, Y. et al., "Dropout as a Bayesian Approximation: Representing Model Uncertainty in Deep Learning", in international conference on machine learning (pp. 1050-1059), Jun. 2016, 10 pages.
Hernandez-Lobato, JM et al., "Probabilistic Backpropagation for Scalable Learning of Bayesian Neural Networks", 2015, 9 pages.
Sniper, "The Sniper Multi-Core Simulator", retrieved from http://snipersim.org/w/The_Sniper_Multi-Core_Simulator, last modified Feb. 16, 2019, 3 pages.

\* cited by examiner

| Performance Indicator | Constraint | Preference | Weight (λ) |
|---|---|---|---|
| Power Consumption | 1 – 5 mW | 2.5 mW | 20 |
| Time-to-solution | <10s | | 5 |
| Tail Latencies | | | 0 |
| ... | ... | ... | ... |
| Parameter | Constraint |
|---|---|
| L1 Code Cache Size | 16000<L1<64000 |
| L2 Cache Size | |
| VPUs | 2<VPU |
| ALUs | |
| ... | ... |
FIG. 3
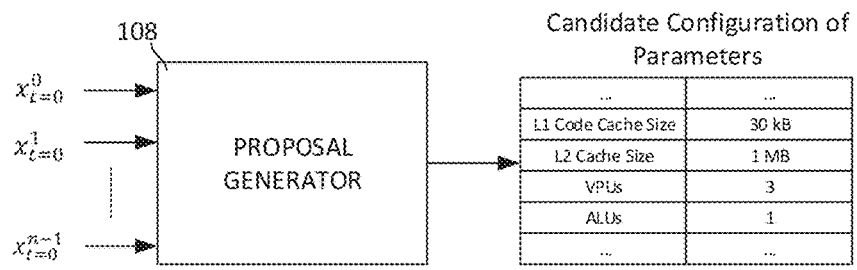
FIG. 4
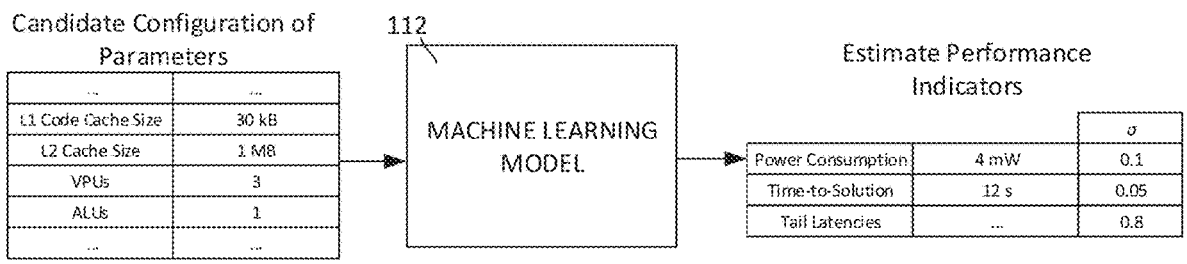
FIG. 5

SYSTEMS AND METHODS FOR DETERMINING A CONFIGURATION FOR A MICROARCHITECTURE

FIELD OF THE DISCLOSURE

This disclosure relates generally to microarchitecture and, more particularly, to systems and methods for determining a configuration for a microarchitecture.

BACKGROUND

Microarchitecture (μarch) refers to the physical organization of the electronic components, structures, and connections of a processor that enable the processor to execute a specific instruction set architecture (ISA). A microarchitecture for a processor is designed by a designer or architect (i.e., a human). The designer or architect selects various parameters, such as size and level of cache, number of virtual processing units (VPUs), number of arithmetic logic units (ALUs), etc. that result in a processor having desired characteristics.

BRIEF DESCRIPTION OF THE DRAWINGS

FIG. 3 shows example user-defined constraints and preferences that may be input to the example system of FIG. 1 by a user.

FIG. 4 shows an example candidate configuration of parameters generated by an example proposal generator of the example system of FIG. 1.

FIG. 5 shows example estimated performance indicators output by an example machine learning model implemented in connection with the example system of FIG. 1.

The figures are not to scale. In general, the same reference numbers will be used throughout the drawing(s) and accompanying written description to refer to the same or like parts.

Figure 1:
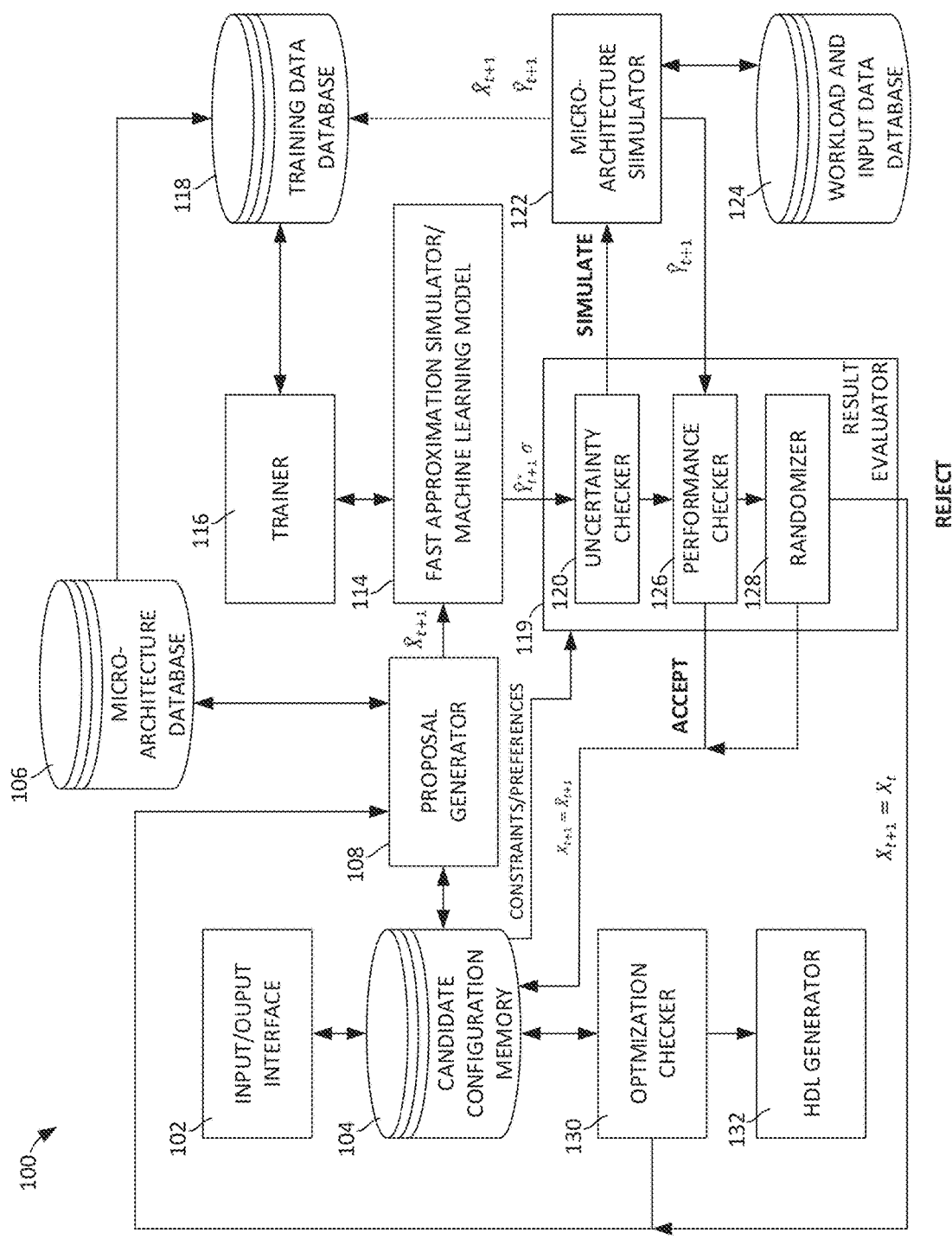
FIG. 1 is block diagram of an example system constructed in accordance with teachings of this disclosure for determining a configuration for a microarchitecture and designing a microarchitecture.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Programmable devices, such as processors, microprocessors, controllers, etc. are becoming more widely used than ever before. Programmable devices are found in almost every electronic device used today. The process of manufacturing a processor or other logic circuit involves designing a specific microarchitecture (sometimes referred to as computer organization because it refers to the layout of circuitry, data paths, etc. within the processor/logic circuit) to implement a given instruction set architecture (ISA) in the processor. After a microarchitecture is established, the processor is manufactured using various semiconductor device fabrication techniques and/or processes that result in the chosen microarchitecture.

There are many different parameters or features that are considered in the microarchitecture design, such as sizes and numbers of cache-levels, numbers of arithmetic logic units (ALUs), number of virtual processing units (VPUs), number of reservations stations, store buffer sizes, data path layouts, etc. These parameters can be changed and/or selected to construct (e.g., optimize) a processor in a machine that satisfies particular objectives, such as low time-to-solution, low power consumption, etc.

However, microarchitectures implicate a vast design space. Therefore, designing a microarchitecture is a time-intense and complicated task. Moreover, in known approaches, such microarchitecture design efforts require manual intervention because a high-dimensional optimization problem needs to be solved. As mentioned above, some prominent architectural decisions in a processor design include sizes and numbers of cache-levels, numbers of ALUs, number of VPUs, etc. Further, low-level settings like latencies of instructions, number of reservation stations, buffer sizes, circuit path layouts, bus design, etc. are also important to the efficacy of the overall design. Moreover, the software, firmware, and hardware components are not optimized at the same time in known approaches. Given the complexity, there are thousands (and potentially up to hundreds of thousands) of different parameters and settings to be considered in a microarchitecture of a logic circuit such as processor, a field programmable gate array (FPGA), and/or an application-specific integrated circuit (ASIC). This results in a combinatorial explosion in the number of possible microarchitecture configurations.

The state-of-the art paradigm in processor design generally requires that architects first run several binaries with a fixed set of settings and ranges of inputs through a cycle-accurate simulator. In other words, after a candidate configuration of parameters is selected, the candidate configuration is tested via a microarchitecture simulator using a set of workloads and input data. This microarchitecture simulation takes a significant amount of time (e.g., a few hours or even days). The microarchitecture simulator outputs values for various characteristics or performance indicators associated with the candidate configuration. These performance indicators may include time-to-solution, power consumption, tail latencies, etc. The architects inspect the results of the simulation. Then, the architects (i.e., one or more human beings) take an educated guess regarding which parameter(s) to modify for improved functionality. Once the parameters are modified, the new candidate configuration of parameters is again tested (e.g., the process is reiterated). Thus, known microarchitecture optimization processes include heavily sequential tasks. Further, manual human labor from experts is needed to change/tune the microarchitecture configuration after each simulation run. Usually, the change of configuration is a non-trivial optimization problem that requires experts to provide educated guesses. Thus, known microarchitecture optimization processes are complex, time consuming, and require human input.

As used herein, the term "configuration" is defined to be a particular combination of one or more parameters used to define a microarchitecture. For example, assume a microarchitecture is defined by three variable parameters such as cache-level size, number of ALUs, and number of VPUs. A first configuration may include a cache-level of size of 16,000, 3 ALUs, and 3 VPUs, a second configuration may include a cache-level size of 16,001, 3 ALUs, and 3 VPUs, a third configuration may include a cache-level size of 16,000, 2 ALUs, and 3 VPUs, and so forth. Thus, each configuration has a different combination of the parameter values. There may be a relatively large number of configurations based on the number of parameters and potential values of those parameters. In some examples, limits on the values of the parameters may be predefined. For example, a user may specify that a configuration should include between 1 and 30 ALUs, 1 and 30 VPUs, etc. Each configuration has specific output or performance results, referred to herein as performance indicators. Example performance indicators may include total consumption power, time-to-solution, and tail latencies.

Disclosed herein are example systems and methods for designing (e.g., optimizing) a microarchitecture. Such example systems and methods use a fast approximation simulator implemented by a machine learning model to estimate performance indicators for a given candidate configuration of parameters without having to perform a full simulation on the candidate configuration. The machine learning model operates relatively quickly and outputs or generates one or more estimated performance indicators for a given candidate configuration of parameters. If the estimated performance indicator(s) are favorable, the candidate configuration may be saved as a potential solution and/or selected as the final configuration to be used for fabricating the microarchitecture. If the estimated performance indicator(s) are not favorable, the candidate configuration may be rejected and another candidate configuration may be generated and analyzed via the machine learning model. This iterative process occurs without performing a full simulation on every candidate configuration, which significantly reduces the time and processor resources spent on iteratively testing and evaluating numerous configurations.

As noted above, example systems disclosed herein include a fast approximation simulator that implements a machine learning model, such as a neural network. The machine learning model may be trained using data from prior configurations and their corresponding performance indicators. For example, processor manufacturers typically have vast repositories or databases of prior microarchitecture designs and the performance indicators associated with each microarchitecture design. The example system leverages such repositories to enhance the microarchitecture design process. This is advantageous, for example, when building a specialized microarchitecture aiming to efficiently execute a handful applications.

In some examples, a designer or architect can define constraints or preferences for one or more of the performance indicators to be optimized. For example, a designer may desire a microarchitecture that has a power consumption of 1-5 mW, preferably, around 2.5 mW. Further, in some examples, the designer or architect can weigh the desired performance indicators to emphasize the most important performance indicators. As the system analyses numerous configurations, those configurations having desirable performance indicators can be stored as potential solutions.

In some examples disclosed herein, the system includes a proposal generator that generates the candidate configurations to be tested. As mentioned above, each configuration includes a different combination of parameters (e.g., number of cache-levels, number of ALUs, number of VPUs, VPU widths, etc.). In some examples, the proposal generator utilizes a Monte Carlo Markov Chain (MCMC) approach to select new parameters from a probability distribution. This approach helps identify which parameters to change in order to advance toward a target solution (e.g., an optimal solution) as opposed to randomly trying every combination of parameters.

The machine learning model is applied to each of the candidate configurations. The machine learning model outputs or generates one or more estimated performance indicators for the corresponding candidate configuration. These estimates are generated without performing a full simulation. In essence, the machine learning model predicts or estimates what the full simulator would output as the performance indicators for a given configuration. The machine learning model is less accurate, but operates more quickly than the full simulator. In some examples, the machine learning model also outputs uncertainty values corresponding to the model's confidence in the estimated performance indicators. If the uncertainty values are high (indicating low confidence in the estimated performance indicators), the candidate configuration can be tested using the full microarchitecture simulator, which outputs accurate performance indicators for a given configuration. Depending on the results of the simulation, the candidate configuration can be rejected or accepted and saved as a potential solution. Further, the output data from the full simulator can be fed back into the training data for the machine learning model. As such, the machine learning model continuously improves (i.e., becomes more accurate in its estimates) as new data is obtained and applied to the model.

If the uncertainty values from the machine learning model are low (indicating high confidence in the estimated performance indicators), the system either accepts or rejects the candidate configuration based on the estimated performance indicators. In particular, the system may determine if the estimated performance indicators have improved relative to a prior candidate configuration and, thus, are moving or converging toward a target that is based on one or more user-defined constraints or preferences (e.g., lowest time-to-solution, lowest power consumption, etc.). If the estimated performance indicators for the candidate configuration are improving, the system saves the candidate configuration as a potential solution and/or selects the candidate configuration as an acceptable (e.g., optimal) microarchitecture design. If the estimated performance indicators for a candidate configuration have not improved relative to a prior candidate configuration, the candidate configuration may be rejected and the proposal generator may generate another candidate configuration to be tested. The example system analyzes numerous candidate configurations until a solution (e.g., a best or optimal solution) is identified. The selected solution represents the candidate configuration of parameters that results in the best performance indicators satisfying the user-defined constraints and preferences relative to the other candidate configurations of parameters. Once a configuration is identified, a processor can be fabricated with a microarchitecture in accordance with the configuration.

Thus, example systems and methods disclosed herein can identify the likelihood a candidate configuration exhibits favorable characteristics without having to perform a full simulation. By reducing or eliminating the need to test each candidate configuration in a full simulation, examples disclosed herein significantly reduces the overall time to identify a configuration for a microarchitecture.

Examples disclosed herein are also advantageous when developing one or more additional product(s) in the same family as a previous processor, where the design constraints and performance parameters are reconfigured to create a new product in that family (e.g., a second generation processor). In such a case, the fast approximation simulator can be reused, thereby further reducing the time required to find configuration parameters for the additional product(s).

Turning to the figures, FIG. 1 is a block diagram of an example system 100 constructed in accordance with teachings of this disclosure. The example system 100 may be used to design (e.g., optimize) a configuration for a microarchitecture of an electronic device (e.g., a logic circuit, an integrated circuit, a processor, a controller, a microprocessor, an FPGA, an ASIC, etc.) based on desired output characteristics (and, in some examples, input parameter constraints). The example system 100 of FIG. 1 utilizes a machine learning model to quickly estimate performance indicators for a given candidate configuration of parameters for the microarchitecture, thereby avoiding the need to perform a full simulation on each candidate configuration.

The example system 100 of FIG. 1 includes an input/output interface 102, a candidate configuration memory 104, a microarchitecture database 106, a proposal generator 108, a fast approximation simulator 114, a trainer 116, a training data database 118, a result evaluator 119, an uncertainty checker 120, a microarchitecture simulator 122, a workload and input data database 124, a performance checker 126, a randomizer 128, an optimization checker 130, and a Hardware Description Language (HDL) generator 132. The example system 100 may be implemented by a processor platform such as a computer or multiple computers. An example processor platform is disclosed in connection with FIG. 7. The processor platform may be used by a user (sometimes referred to as a designer or architect) when trying to optimize a design for a microarchitecture for a processor.

The input/output interface 102 receives input data from a user. The input data may include one or more limits or constraints for the parameters X defined by the user, one or more limits or constraints for the performance indicators Y defined by the user, one or more preferences for performance indicators Y defined by the user, and/or one or more weights for various performance indicators Y defined by the user. As used herein, $X_t$ represent parameters at time t, and $Y_t$ represents performance indicators at time t. Also, as used herein, an approximation is denoted by a start superscript (e.g., X*) and a proposed value is denoted by a hat (e.g., $\hat{X}$). Additionally, the input/output interface 102 may output data to the user via any type of output device. For example, the input/output device 102 may display one or more candidate configurations, the performance indicators Y associated with the candidate configurations of parameters X, etc.

In some examples, the input data from the input/output interface 102 is stored in the example candidate configuration memory 104 of FIG. 1. In some examples, this input data (e.g., the user-defined constraints, preferences, and/or weights) is provided to the result evaluator 119. The candidate configuration memory 104 may also store candidate configurations of parameters X to be tested, and/or candidate configurations of parameters X identified as potential solutions, as disclosed in further detail herein.

The proposal generator 108 generates a candidate configuration of parameters $\hat{X}_{t+1}$ to be tested by the fast approximation simulator 114. In some examples, the proposal generator 108 generates the candidate configuration of parameters $\hat{X}_{t+1}$ by sampling parameters from a probability distribution. The proposal generator 108 selects parameters that meet the user-defined constraints.

After the proposal generator 108 generates the candidate configuration of parameters $\hat{X}_{t+i}$, the candidate configuration of parameters $\hat{X}_{t+1}$ is processed or evaluated by the fast approximation simulator 114. The fast approximation simulator 114 is a machine learning model. Therefore, the fast approximation simulator 114 is also referred to herein as a machine learning model 114. In general, when a configuration of parameters X is input to the machine learning model 114, the machine learning model 114 outputs estimated performance indicators Y for the configuration of parameters X, i.e., $Y=f(X)$. In essence, the machine learning model 114 predicts or estimates what the microarchitecture simulator 122 would output as the performance indicators if the configuration were evaluated using the microarchitecture simulator 122. Therefore, the machine learning model 114 outputs or generates estimated performance indicators $\hat{Y}_{t+1}*$ for the corresponding candidate configuration of parameters $\hat{X}_{t+1}$. The machine learning model 114 also outputs uncertainty values σ associated with the estimated performance indicators $\hat{Y}_{t+1}*$. The uncertainty values σ indicate the confidence of the accuracy of the results.

The estimated performance indicators $\hat{Y}_{t+1}*$ and the uncertainty values σ from the fast approximation simulator/machine learning model 114 are provided to a result evaluator 119. The result evaluator 119 determines whether to (1) send the candidate configuration of parameters $\hat{X}_{t+1}$ to the microarchitecture simulator 122 for a full simulation (SIMULATE), (2) accept the candidate configuration of parameters $\hat{X}_{t+1}$ as s potential solution (ACCEPT), or (3) reject the candidate configuration of parameters $\hat{X}_{t+1}$ (REJECT). In the illustrated example, the result evaluator 119 includes the uncertainty checker 120, the performance checker 126, and the randomizer 128.

In some examples, the uncertainty checker 120 determines whether a full simulation should be performed on the candidate configuration of parameters $\hat{X}_{t+1}$ based on the uncertainty values σ. If the uncertainty values indicate the estimated performance indicators $\hat{Y}_{t+1}*$ are unreliable, then a full simulation is be performed. In such an instance, the candidate configuration of parameters $\hat{X}_{t+1}$ is transferred to the microarchitecture simulator 122. The microarchitecture simulator 122 performs a full simulation on the candidate configuration of parameters $\hat{X}_{t+1}$ using workload sets and input data from the workload and input data database 124. The microarchitecture simulator 122 outputs performance indicators $\hat{Y}_{t+1}$.

However, if the uncertainty checker 120 determines the estimate performance indicators $\hat{Y}_{t+1}*$ are reliable, the result evaluator 119 may accept the candidate configuration of parameters $\hat{X}_{t+1}$ as a potential solution or reject the candidate configuration of parameters $X_{t+1}$, as disclosed in further detail here. As such, the machine learning model 114 estimates what the microarchitecture simulator 114 would output as the performance indicators without having to actually perform the full simulation. The candidate configuration of parameters $\hat{X}_{t+1}$ can then be accepted and potentially used as the final configuration or rejected and another configuration can be generated and evaluated. Therefore, the machine learning model 114 saves significant time in the overall process of evaluating a candidate configuration of parameters.

If the uncertainty checker 120 determines the estimated performance indicators $\hat{Y}_{t+1}*$ are reliable, the performance checker 126 determines whether the estimated performance indicators $\hat{Y}_{t+1}^*$ are improving (e.g., relative to performance indicators from prior iterations) toward a target. The target is based on the one or more user-defined constraints and/or preferences for the performance indicators. In some examples, the performance checker 120 uses a cost function, as disclosed in further detail herein. If the estimated performance indicators $\hat{Y}_{t+1}^*$ are improving, the candidate configuration of parameters $\hat{X}_{t+1}$ is accepted as a potential solution and saved or flagged in the candidate configuration memory 104 as a potential solution. The optimization checker 130 then determines whether the candidate configuration of parameters $\hat{X}_{t+1}$ is the best or optimal solution (e.g., based on the performance indicator constraints from the user) and/or if the best or optimal solution has been identified yet (e.g., based on a plurality of potential solutions stored in the candidate configuration memory 104). If a best or optimal solution has been identified, the HDL generator 132 generates HDL and/or creates an HDL file for the identified candidate configuration. The HDL file can then be used to manufacture or fabricate a processor with the corresponding microarchitecture. If the best or most optimal solution has not been identified, the proposal generator 108 generates another candidate configuration of parameters to be evaluated and the process is repeated.

Turning back to the performance checker 126, if the performance checker 126 determines the estimated performance indicators $\hat{Y}_{t+1}^*$ are not improving toward the target, the randomizer 128 determines whether to still accept the candidate configuration of parameters $\hat{X}_{t+1}$ or reject the candidate configuration of parameters $\hat{X}_{t+1}$. In some examples, the randomizer 128 randomly selects (e.g., based on a random function) whether to accept or reject a candidate configuration of parameters. This enables potentially worse candidate configurations to be saved and used as the basis for further candidate configurations to enable the performance indicators to move out of a local minimum (e.g., where some of the performance indicators satisfy the user-defined constraints and/or preferences while other performance indicators do not satisfy the user-defined constraints and/or preferences) and potentially find a better candidate configuration having better performance indicators (e.g., where all of the performance indicators satisfy the user-defined constraints and preferences).

The performance checker 126 and the randomizer 128 similarly analyze the performance indicators $\hat{Y}_{t+1}$ output by the microarchitecture simulator 122 and determine whether to accept or reject the candidate configuration of parameters. The example process may be repeated multiple times to evaluate numerous candidate configurations of parameters. In particular, the example system 100 may evaluate numerous (e.g., hundreds, thousands, hundreds of thousands, etc.) candidate configurations relatively quickly until a solution (e.g., the best or optimal solution) is identified.

When a full simulation is performed on a candidate configuration of parameters, the performance indicators output by the microarchitecture simulator 122 as well as the candidate configuration can be stored in the training data database 118. This data can be used with other known configurations and their performance indicators to train the machine learning model 114. Accordingly, as the system 100 evaluates many candidate configurations, the machine learning model 114 becomes more accurate and, thus, the entire process becomes faster.

The example input/output interface 102 of the illustrated example of FIG. 1 is implemented by one or more ports (e.g., USB ports) of a communication card or the like. However, any other type of circuitry may additionally or alternatively be used such as, for example, one or more analog or digital circuit(s). Moreover, the input/output interface 102 may be configured by one or more software or firmware devices executed by a hardware processor. The input/output interface 102 may enable communication to/from an input and/or output device such as a keyboard mouse, touchpad, display, touchscreen, etc. As disclosed above, the example input/output interface 102 is to receive input data from a user, such as one or more parameter limits or constraints, one or more performance indicator limits or constraints, one or more performance indicator preferences, and/or weights for various performance indicators. Additionally, the input/output interface 102 may output data to the user via any type of output device. For example, the input/output device 102 may display one or more candidate configurations, the performance indicators associated with the candidate configurations, etc.

The example candidate configuration memory 104 of the illustrated example of FIG. 1 is implemented by any memory, storage device and/or storage disc for storing data such as, for example, flash memory, magnetic media, optical media, solid state memory, hard drive(s), thumb drive(s), dynamic random access memory, non-volatile memory, etc. Furthermore, the data stored in the example candidate configuration memory 104 may be in any data format such as, for example, binary data, comma delimited data, tab delimited data, structured query language (SQL) structures, etc. While, in the illustrated example, the candidate configuration memory 104 is illustrated as a single device, the example candidate configuration memory 104 and/or any other data storage devices described herein may be implemented by any number (including one) and/or type(s) of memories. The candidate configuration memory 104, the microarchitecture database 106, the training data database 118, and the workload and input data database 124 may all be located in one physical device and/or distributed into two or more physical devices. The physical storage device(s) may be local to the system 100 (as shown in FIG. 1) and/or some or all of the memory devices may be remote and accessible via a network such as the Internet. In some instances, one or more of the databases/memories are implemented by virtual memory accessible via one or more virtual machines or containers. The example candidate configuration memory 104 of FIG. 1 may store the input data (e.g., constraints, preferences, etc.) provided by a user, candidate configurations to be tested, and/or candidate configurations identified as potential solutions.

The example microarchitecture database 106 of the illustrated example of FIG. 1 is implemented by any memory, storage device and/or storage disc for storing data such as, for example, flash memory, magnetic media, optical media, solid state memory, hard drive(s), thumb drive(s), dynamic random access memory, non-volatile memory, etc. Furthermore, the data stored in the example microarchitecture database 106 may be in any data format such as, for example, binary data, comma delimited data, tab delimited data, structured query language (SQL) structures, etc. In the illustrated example of FIG. 1, the example microarchitecture database 106 stores or contains prior microarchitecture configurations and the performance indicators associated with the configurations. The microarchitecture database 106 may be, for example, a library or repository of past microarchitectures. In some examples the data from the microarchitecture database 106 is used by the proposal generator 108 when selecting a first candidate configuration of parameters to evaluate. In some examples, the data in the microarchitecture database 106 is shared with the training data in the training data database 118 and used to train and/or retrain the fast approximation simulator/machine learning model 114.

As disclosed above, the example proposal generator 108 generates candidate configurations of parameters to be evaluated. The proposal generator 108 of the example illustrated in FIG. 1 is implemented by a logic circuit such as, for example, a hardware (e.g., silicone based) processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the proposal generator 108 implements means for generating a candidate configuration of parameters. The means for generating a candidate configuration of parameters may additionally or alternatively be implemented by block 208 of FIG. 2.

The example fast approximation simulator/machine learning model 114 evaluates or processes a candidate configuration and outputs a result identifying the efficacy of the configuration. The example fast approximation simulator/machine learning model 114 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the fast approximation simulator/machine learning model 114 implements means for applying machine learning to a candidate configuration of parameters. The means for applying the machine learning may additionally or alternatively be implemented by block 210 of FIG. 2.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a Bayesian Neural Network (BNN) model is used to implement the machine learning model 114. A BNN model may be advantageous because, in addition to outputting an estimation (e.g., one or more estimated performance indicators), it also outputs an uncertainty value related to the uncertainty or confidence in the estimation. However, other types of machine learning models could additionally or alternatively be used such as Gaussian Process, Latent Variable Models or Variational Auto-Encoders.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, the machine learning model 114 is trained using backpropagation that may be implemented by the trainer 116. However, any other type of training algorithm may additionally or alternatively be used. In examples disclosed herein, training is performed until the model converges or stops improving. In examples disclosed herein, training is performed locally at the system 100. Training may be performed asynchronously if the system 100 has many machines (e.g., a cluster). In other examples, training may be performed remotely. Training is performed using hyperparameters that control how the learning is performed (e.g., a learning rate, a number of layers to be used in the machine learning model, etc.). In examples disclosed herein, hyperparameters that control how learning is performed include dropout, learning rate, and standard deviation of the proposal distribution for the MCMC steps. Such hyperparameters are selected manually or automatically and may be based on the application. In some examples re-training may be performed. Such re-training may be performed in response to new data from the microarchitecture simulator 122. For example, each time the microarchitecture simulator 122 performs a simulation on a candidate configuration, the microarchitecture simulator 122 outputs accurate performance indicators associated with the corresponding candidate configuration. This new data can be used to retrain the machine learning model 114. The example trainer 116 of the illustrated example of FIG. 1 is implemented by a logic circuit such as, for example, a hardware (e.g., semiconductor based) processor. However, any other type(s) of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

As disclosed above, training is performed using training data. In examples disclosed herein, the training data originates from prior microarchitecture designs from a manufacturer's repository (e.g., stored in the microarchitecture database 106) and/or new microarchitecture design data generated by the microarchitecture simulator 122 during the evaluation (e.g., optimization) process. The training data is stored in the example training data database 118 of the illustrated example of FIG. 1. The training data database 118 is implemented by any memory, storage device and/or storage disc for storing data such as, for example, flash memory, magnetic media, optical media, solid state memory, hard drive(s), thumb drive(s), dynamic random access memory, non-volatile memory, etc. The data stored in the example training data database 118 may be in any data format such as, for example, binary data, comma delimited data, tab delimited data, structured query language (SQL) structures, etc.

Because supervised training is used, the training data is labeled. In some examples, labeling is applied to the training data by the microarchitecture simulator 122 when the microarchitecture simulator 122 outputs data (e.g., performance indicators) after a full simulation. In some examples, the training data is sub-divided into training data and test data.

Once training is complete, the machine learning model 114 is deployed for use as an executable construct that processes an input (e.g., a candidate configuration of parameters) and provides an output (e.g., estimated performance indicators) based on the network of nodes and connections defined in the machine learning model 114.

Once trained, the machine learning model 114 is available to be operated in an inference phase to process data. In the inference phase, the proposal generator 108 inputs data to be analyzed (e.g., live data) to the machine learning model 114, and the machine learning model 114 executes to create an output. This inference phase can be thought of as the AI "thinking" to generate the output based on what it learned from the training (e.g., by executing the machine learning model 114 to apply the learned patterns and/or associations to the live data). In some examples, input data undergoes pre-processing before being used as an input to the machine learning model 114. Moreover, in some examples, the output data may undergo post-processing after it is generated by the machine learning model 114 (e.g., transformed into displayable output data, transformed into an instruction to be executed by a machine, etc.).

In some examples, the output of the machine learning model 114 may be captured and provided as feedback for further training to the machine learning model 114. By analyzing the feedback, an accuracy of the machine learning model 114 can be determined. If the feedback indicates that the accuracy of the machine learning model 114 is less than a threshold or other criterion, training of an updated model can be triggered by using the feedback and an updated training data set, hyperparameters, etc., to generate an updated model.

The example uncertainty checker 120 determines whether the estimated performance indicators output by the machine learning model 114 are reliable. The example uncertainty checker 120 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the uncertainty checker 120 implements means for determining whether the estimated performance indicators are reliable. The means for determining whether the estimated performance indicators are reliable may additionally or alternatively be implemented by block 212 of FIG. 2.

The example microarchitecture simulator 122 performs a full simulation on some of the candidate configurations of the microarchitecture. An example of the microarchitecture simulator 122 is a Sniper multi-core simulator (see website http://snipersim.org/w/The_Sniper_Multi-Core_Simulator), which is an x86 simulator. The microarchitecture simulator 122 only operates on candidate configurations that have been first tested or processed by the machine learning model 114 and which did not show reasonable uncertainty values σ. To this end, the example microarchitecture simulator 122 uses workloads and input data from the workload and input data database 124. The microarchitecture simulator 122 outputs performance indicators resulting from the candidate configuration. The example microarchitecture simulator 122 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the microarchitecture simulator 122 implements means for determining performance indicators for a given candidate configuration. The means for determining performance indicators for a given candidate configuration may additionally or alternatively be implemented by block 216 of FIG. 2.

The example workload and input data database 124 of the illustrated example of FIG. 1 is implemented by any memory, storage device and/or storage disc for storing data such as, for example, flash memory, magnetic media, optical media, solid state memory, hard drive(s), thumb drive(s), dynamic random access memory, non-volatile memory, etc. Furthermore, the data stored in the example workload and input data database 124 may be in any data format such as, for example, binary data, comma delimited data, tab delimited data, structured query language (SQL) structures, etc. In the illustrated example of FIG. 1, the example workload and input data database 124 stores workload data and input data used by the microarchitecture simulator 122 for evaluating a candidate configuration. The workload data and input data may be specific to a certain type of microarchitecture that is trying to be optimized.

The example performance checker 126 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the performance checker 126 implements means for determining whether the performance indicators are improving toward a target (e.g., the one or more user-defined performance indicator constraints and/or preferences). The means for determining whether the performance indicators are improving may additionally or alternatively be implemented by block 214 of FIG. 2. The example performance checker 126 determines whether the performance indicators for a candidate configuration are improving toward a target relative to performance indicators from a prior candidate configuration.

The example randomizer 128 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the randomizer 128 implements means for accepting or rejecting a candidate configuration. The means for accepting or rejecting a candidate configuration may additionally or alternatively be implemented by block 222 of FIG. 2. The example randomizer 128 determines whether to accept or reject a candidate configuration in which the performance indicators did not improve.

The example optimization checker 130 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc.

In this example, the optimization checker 130 implements means for determining whether an optimal candidate configuration has been identified. The means for determining whether an optimal candidate configuration has been identified may additionally or alternatively be implemented by block 224 of FIG. 2. The example optimization checker 130 determines whether an optimal candidate configuration has been identified.

The example HDL generator 132 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. In this example, the HDL generator 132 implements means for generating HDL and/or creating an HDL file. The means for generating HDL and/or creating an HDL file may additionally or alternatively be implemented by block 226 of FIG. 2. The example HDL generator 132 generates HDL and/or creating an HDL file for the final or optimized candidate configuration. The HDL file can then be used to manufacture or fabricate a processor with the corresponding microarchitecture.

While an example manner of implementing the system 100 is illustrated in FIG. 1, one or more of the elements, processes and/or devices illustrated in FIG. 1 may be combined, divided, re-arranged, omitted, eliminated and/or implemented in any other way. Further, the example input/output interface 102, the example proposal generator 108, the example fast approximation simulator/machine learning model 114, the example trainer 116, the example result evaluator 119, the example uncertainty checker 120, the example microarchitecture simulator 122, the example performance checker 126, the example randomizer 128, the example optimization checker 130, the example HDL generator 132 and/or, more generally, the example system 100 of FIG. 1 may be implemented by hardware, software, firmware and/or any combination of hardware, software and/or firmware. Thus, for example, any of the example input/output interface 102, the example proposal generator 108, the example fast approximation simulator/machine learning model 114, the example trainer 116, the example result evaluator 119, the example uncertainty checker 120, the example microarchitecture simulator 122, the example performance checker 126, the example randomizer 128, the example optimization checker 130, the example HDL generator 132 and/or, more generally, the example system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input/output interface 102, the example proposal generator 108, the example fast approximation simulator/machine learning model 114, the example trainer 116, the example result evaluator 119, the example uncertainty checker 120, the example microarchitecture simulator 122, the example performance checker 126, the example randomizer 128, the example optimization checker 130, and/or the example HDL generator 132 is/are hereby expressly defined to include a non-transitory computer readable storage device or storage disk such as a memory, a digital versatile disk (DVD), a compact disk (CD), a Blu-ray disk, etc. including the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
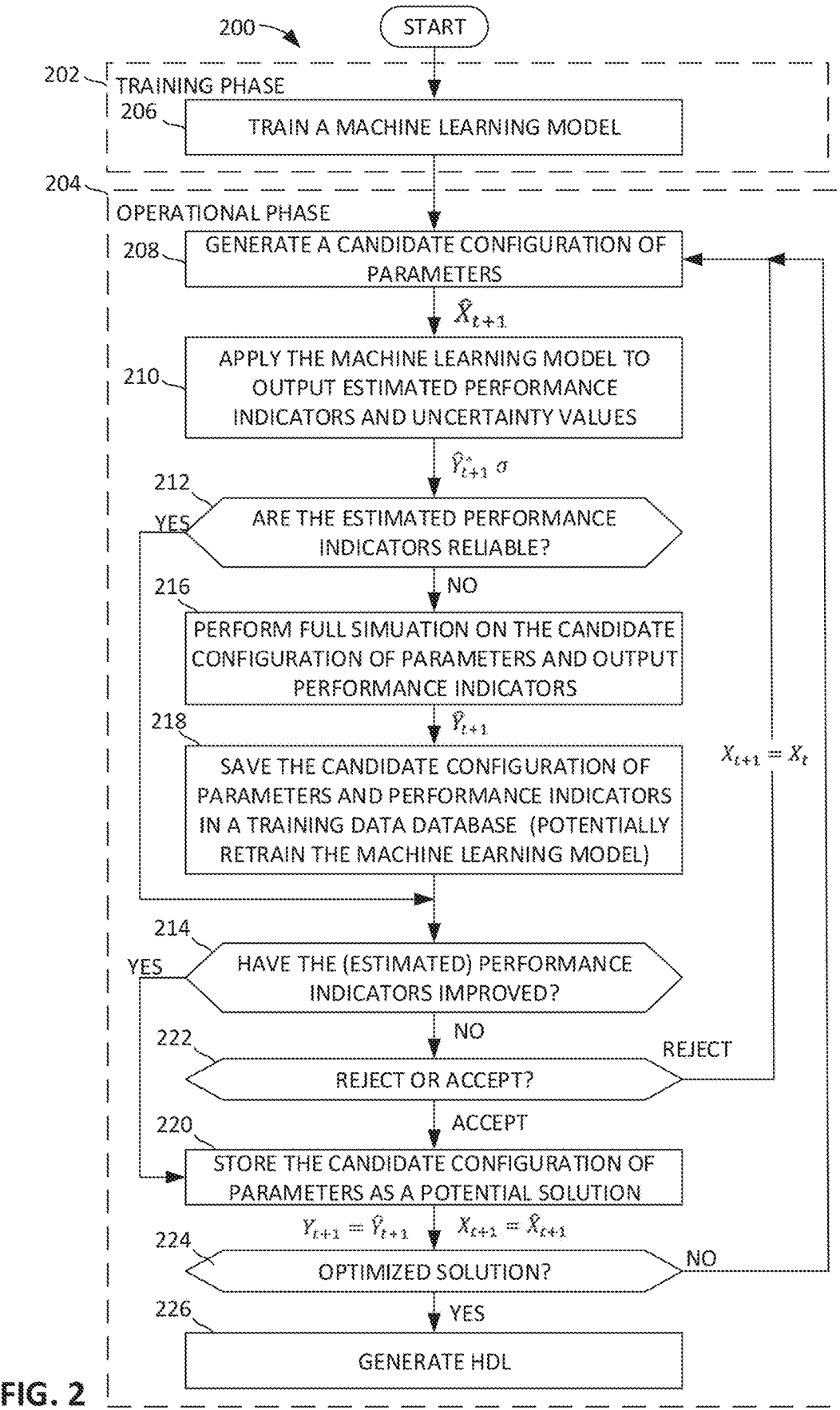
FIG. 2 is a flowchart representative of example machine readable instructions that may be executed to implement the example system of FIG. 1.

A flowchart representative of example hardware logic, machine readable instructions, hardware implemented state machines, and/or any combination thereof for implementing the system 100 of FIG. 1 is shown in FIG. 2. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 2, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 2 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 2 is a flowchart representative of example machine readable instructions that may be executed to implement the example system 100 of FIG. 1. The example process 200 of FIG. 2 includes a training phase 202 and an operational phase 204.

The example process 200 of FIG. 2 begins when a request is received from a user to determine an optimal microarchitecture configuration. The user may enter, via the input/output interface 102, input data that includes one or more constraints and/or preferences for the parameters X and/or the performance indicators Y. In some examples, the input interface 102 saves the input data in the candidate configuration memory 104.

For example, referring briefly to FIG. 3, FIG. 3 illustrates an example of input data 300 that may be entered by a user. In some examples, the user can define constraints for one or more of the performance indicators. A constraint may be a maximum, a minimum, or a range. For example, as shown in FIG. 3, the performance indicators include power consumption, time-to-solution, and tail latencies. In other examples, there may be different, similar, fewer, or more types of performance indicators. In the illustrated example, the user-defined a constraint of 1-5 milliwatts (mW) for the power consumption performance indicator and a constraint of less than 10 seconds (s) for the time-to-solution performance indicator. Other ones of the performance indicators may not contain any constraints. For example, as shown in FIG. 3, the user did not define any constraints for the tail latencies. As such, the user does not have a requirement for the values of the tail latencies.

Additionally or alternatively, the user may enter a preference for one or more of the performance indicators. For example, as shown in FIG. 3, the user entered a preference of 2.5 mW for the power consumption. The user may similarly define preferences for other ones of the performance indicators or may not define preferences for the performance indicators. In some examples, the user can define weights λ (sometimes referred to as knobs) for the performance indicators. The weights λ represent the importance of the respective performance indicators. For example, the user entered 20 for the power consumption performance indicator (e.g., indicating a high importance) and 5 for time-to-solution performance indicator (e.g., indicator a medium importance). Performance indicators that are not important to the user are given a weight λ of 0. In this example, the power consumption is the most important performance indicator to the user. The weights λ may be used in a cost function (disclosed in further detail herein) to emphasize which performance indicators to optimize.

Further, in some examples, the user may define constraints for one or more of the parameters to be evaluated. A constraint may be a minimum, a maximum, or a range. For example, as shown in FIG. 3, the potential parameters includes L1 code cache size, L2 cache size, number of VPUs, number of ALUs, etc. The potential parameters may include more or fewer parameters. In the illustrated example of FIG. 3, the user has defined a constraint for L1 cache-level size of 16,000-64,000 kB and a constraint for the number of VPUs to be greater than 2. Constraints were not provided for other ones of the parameters.

Turning back to FIG. 2, in some examples, at block 206, the machine learning model 114 is at least partially trained prior to proceeding with the operational phase 204. Additionally or alternatively, the machine learning model 114 is trained one or more times during the operational phase 204, as disclosed in further detail herein. To train the machine learning model 114, the trainer 116 feeds the training data from the training data database 118 through the machine learning model 114. The training data includes known configurations of parameters X and the known performance indicators Y for the corresponding configurations (which may come from the microarchitecture simulator 122). As such, the machine learning model 114 learns the simulation function $f(\cdot)$ from sets of $\{X, Y\}$ pairs. In other words, the machine learning model 114 predicts or estimates what the microarchitecture simulator 122 would output as the performance indicators if the configuration were evaluated using the microarchitecture simulator 122. The machine learning model 114 estimates or predicts one or more performance indicators for a given candidate configuration of parameters for a microarchitecture.

At block 208, the proposal generator 108 generates a candidate configuration of parameters $\hat{X}_{t+1}$ to be tested (e.g., a first candidate configuration of parameters). In some examples, during a first iteration of the example process 200, the proposal generator 108 initializes the parameters by sampling from a user-defined prior probability distribution $X_0 \sim P(X)$. An example of P(X) can be a uniform distribution on the possible values of X (which may be limited by the user-defined constraints (e.g., $P(X)=U(X_{min}, X_{max})$). In some examples, the priors can be configured to start closer to well-known parameters (e.g., from known configurations stored in the microarchitecture database 106). The proposal generator 108 uses the initial parameters $X_0$ to generate the candidate configuration of parameters $\hat{X}_{t+1} \sim P(X_{t+1}|X_t)$, which is then evaluated as disclosed in further detail herein. In some examples, an initial configuration can be given by the workload or randomly initialized. In some examples, the proposal generator 108 saves the candidate configuration of parameters $\hat{X}_{t+1}$ in the candidate configuration memory 104.

An example of the proposal generator 108 is a Multivariate Gaussian probability distribution with mean equal to current parameter values and hand tuned diagonal covariance to control the step size in each dimension: $P(X_{t+1}|X_t)=N(\mu=X_t, \sigma)$. As disclosed above, if there are any user-defined constraint(s), the proposal generator 108 only selects parameter values that comply with the user-defined constraints for the parameters.

Turning briefly to FIG. 4, FIG. 4 illustrates an example candidate configuration of parameters $\hat{X}_{t+1}$ generated by the proposal generator 108 based on various parameters stored in a vector of parameters denoted by x. The candidate configuration of parameters $\hat{X}_{t+1}$ includes a combination of the parameters: L1 code cache size, L2 cache size, number of VPUS, number of ALUs. More or fewer and/or different and/or similar parameters may be included in the configuration.

At block 210 of FIG. 2, the fast approximation simulator/machine learning model 114 applies the machine learning model 114 to the candidate configuration of parameters $\hat{X}_{t+1}$. In general, when a configuration of parameters X is input to the machine learning model 114, the machine learning model 114 outputs or generates estimated performance indicators Y for the configuration of parameters X, i.e., $Y=f(X)$. In essence, the machine learning model 114 predicts or estimates what the microarchitecture simulator 122 would output as the performance indicators if the configuration were evaluated using the microarchitecture simulator 122.

As disclosed above, in some examples, the machine learning model 114 is a Neural Network, such as a BNN. BNNs have the capability to obtain very good approximations, using supervised learning techniques for example. In some examples, the weights in the BNN model that connect between neurons in each layer are defined by a probability distribution.

For example, for a given candidate configuration of candidate parameters X, a BNN computes an output as follows. First, a value for the weights of the BNN is obtained by sampling their probability distributions. Next, the input is applied as a feedforward pass on this sampled version of the network. At the end of this feedforward pass, an output is obtained. This process may be repeated multiple times (e.g., twenty times) to obtain many outputs from the BNN. Eventually, these outputs are combined to generate the output Y with its uncertainty value $\sigma$. In some examples, sampling the weights before performing each forward pass drastically increases the computational cost, this problem can be avoided using more efficient approximations.

The machine learning model 114 outputs estimated performance indicators $\hat{Y}_{t+1}^*$ that may be exhibited by a microarchitecture having the candidate configuration of parameters $\hat{X}_{t+1}$. Additionally, the machine learning model 114 outputs uncertainty values $\sigma$ associated with the estimated performance indicators $\hat{Y}_{t+1}^*$. The uncertainty values $\sigma$ indicate the level of quality or confidence of the estimation.

For example, FIG. 5 illustrate an example of estimated performance indicators $\hat{Y}_{t+1}^*$ output by the machine learning model 114 based on the candidate configuration of parameters $\hat{X}_{t+1}$. Example uncertainty values $\sigma$ output by the machine learning model 114 for each of the estimated performance indicators $\hat{Y}_{t+1}^*$ are also shown in FIG. 5.

At block 212 of FIG. 2, the uncertainty checker 120 determines whether the estimated performance indicators $\hat{Y}_{t+1}^*$ are reliable. In other words, the uncertainty checker 120 determines whether the machine learning model 114 is confident in its results. If the uncertainty checker 120 determines the estimated performance indicators $\hat{Y}_{t+1}^*$ are reliable, control proceeds to block 214, discussed in further detail below. If the uncertainty checker 120 determines the estimated performance indicators $\hat{Y}_{t+1}^*$ are not reliable, control proceeds to block 216 and a full simulation is performed on the candidate configuration of parameters $\hat{X}_{t+1}$, as discussed in further detail below.

In some examples, the uncertainty checker 120 determines whether the estimated performance indicators $\hat{Y}_{t+1}^*$ are reliable based on the uncertainty values $\sigma$ output by the machine learning model 114. In some examples, the uncertainty checker 120 determines whether the estimated performance indicators $\hat{Y}_{t+1}^*$ are reliable by calculating a weighted average u of the uncertainty values $\sigma$. Equation 1 below is an example equation that may be used by the uncertainty checker 120 to calculate the weighted average u.

$$u = \frac{1}{n}\sum_{i=0}^{n} \lambda_i \sigma_i \qquad \text{Equation 1}$$

In Equation 1, $\lambda$ represents the weights provided by the user for the corresponding performance indicator (e.g., as set by the user in FIG. 3). The uncertainty checker 120 then compares the weighted average u to an uncertainty threshold $\tau$. In some examples, the uncertainty threshold $\tau$ is defined by the user (e.g., via the input/output interface 102). The uncertainty threshold $\tau$ can be tuned depending on the desired level of accuracy. If the weighted average u is less than the uncertainty threshold $\tau$, the weighted average u does not satisfy the uncertainty threshold $\tau$, which indicates a low level of uncertainty (i.e., high confidence) in the estimated performance indicators $\hat{Y}_{t+1}^*$. In such an example, control proceeds to block 214. If the weighted average u is greater than the uncertainty threshold $\tau$, the weighted average u satisfies the uncertainty threshold $\tau$, which indicates a high level of uncertainty (i.e., low confidence) in the estimated performance indicators $\hat{Y}_{t+1}^*$. In such an example, control proceeds to block 216. If there is only one estimated performance indicator (and, thus, only one uncertainty value $\sigma$), then a weighted average may not be calculated. Instead, the uncertainty checker 120 may compare the single uncertainty value a to the uncertainty threshold r.

At block 216, because the estimated performance indicators $\hat{Y}_{t+1}^*$ are considered unreliable and, thus, the output of the machine learning model 114 is considered unreliable, the microarchitecture simulator 122 performs a full simulation on the candidate configuration of parameters $\hat{X}_{t+1}$. In other words, the microarchitecture simulator 122 is only used (in this example) to perform a full simulation on a candidate configuration if the estimated performance indicators $\hat{Y}_{t+1}^*$ from the machine learning model 114 are deemed unreliable. The microarchitecture simulator 122 performs a full simulation on the candidate configuration of parameters $\hat{X}_{t+1}$ using target workloads and datasets from the workload and input database 124. The microarchitecture simulator 122 is a performance simulator of a future processor. The microarchitecture simulator 122 can run binaries of a future processor and model the important and performance critical details of a processor. This full simulation may take a significant amount of time, such as a few hours, depending on the complexity and size of the workloads. Thus, avoiding such full simulation when the machine learning model 114 is sufficiently reliable saves considerable resources. The microarchitecture simulator 122 generates or outputs performance indicators $\hat{Y}_{t+1}$ for the corresponding candidate configuration of parameters $\hat{X}_{t+1}$.

After the microarchitecture simulator 122 outputs the performance indicators $\hat{Y}_{t+1}$, the microarchitecture simulator 122, at block 218, saves the candidate configuration of parameters $\hat{X}_{t+1}$ and the performance indicators $\hat{Y}_{t+1}$ in the training data database 118 for the machine learning model 114. This data can then be used to retrain the machine learning model 114 in the future. In particular, the trainer 116 can retrain the machine learning model 114 based on the training data (including the new data) in the training data database 118. With a higher volume of accurate data, the machine learning model 114 becomes more accurate. In some examples, the machine learning model 114 is retrained each time new data is added. In other examples, the machine learning model 114 may be retrained at other times. After the data is saved, control proceeds to block 214.

Assuming the uncertainty checker 120 determines the estimated performance indicators $\hat{Y}_{t+1}^*$ were reliable (at block 212), a full simulation is not performed. Instead, in response to a determination that the estimated performance indicators $\hat{Y}_{t+1}^*$ are reliable, control proceeds directly to block 214. Blocks 214 and 222 are described in connection with the estimated performance indicators $\hat{Y}_{t+1}^*$ from the fast approximation simulator/machine learning model 114 (from block 212). However, the functions of blocks 216 and 222 may be similarly performed in connection with the performance indicators $\hat{Y}_{t+1}$ from the microarchitecture simulator 122 (from blocks 216 and 218).

At block 214, the performance checker 126 determines whether the estimated performance indicators $\hat{Y}_{t+1}^*$ for the candidate configuration of parameters have improved toward a target, relative to performance indicators from a prior candidate configuration. The target is based on the at least one of the user-defined constraint(s) and/or the user-defined preference(s) (e.g., as defined FIG. 3). If the performance checker 126 determines the estimated performance indicators $\hat{Y}_{t+1}^*$ have improved toward the target, the candidate configuration of parameters is accepted ($X_{t+1} = \hat{X}_{t+1}$) and control proceeds to block 220. At block 220, the performance checker 126 stores the candidate configuration of parameters $\hat{X}_{t+1}$ and the corresponding performance indicators ($Y_{t+1} = \hat{Y}_{t+1}$) in the candidate configuration memory 104 as a potential solution. As such, a potential solution is identified without performing a full simulation on the candidate configuration of parameters $\hat{X}_{t+1}$. If the performance checker 126 determines the estimated performance indicators $\hat{Y}_{t+1}^*$ have not improved toward the target (e.g., are worse than prior performance indicators), control proceeds to block 222, as discussed in further detail below.

In some examples, the performance checker 126 determines whether the estimated performance indicators $\hat{Y}_{t+1}^*$ have improved using Equation 2 below, which is a comparison or ratio $\alpha$ of a cost function J( ) of the estimated performance indicators $Y_{t+1}^*$ and a cost function J( ) of the prior performance indicators $Y_t$ associated with a prior candidate configuration of parameters.

$$a = J(Y_t)/J(Y_{t+1}^*) \qquad \text{Equation 2}$$

An example cost function J(Y) is provided below in Equation 3.

$$J(Y) = \Sigma_{i=0}^{n} \lambda_i \|\rho_i - \alpha_i\| - \Sigma_{i=0}^{N} \log(c_i - k_i \alpha_i) \qquad \text{Equation 3}$$

In general, a lower cost function value indicates better or improving performance indicators, i.e., the performance indicators are moving closer to the user-defined constraints and/or preferences. In Equation 3, $\rho \in \mathbb{R}^n$ represents the user-defined performance indicators (e.g., see FIG. 3) and $\alpha \in \mathbb{R}^n$ represents the performance indicators (the estimated performance indicators $Y_{t+1}^*$). The difference between these values is weighted by $\lambda \in \mathbb{R}^n$, which represents the weights that may be provided by the user (e.g., see FIG. 3). The weights $\lambda$ penalize or encourage the output values (the performance indicators) to change towards the preferences. The weights $\lambda$ can be seen as the knobs that the user has to tune the microarchitecture to the design requirements. This enables the user to run the optimization process with different weights for the cost function obtaining different microarchitecture configurations that satisfy different criteria. In FIG. 3, for example, the user placed higher weight or importance on the power consumption performance indicator. The performance checker 126 may store the value of the cost function in the candidate configuration memory 104.

In addition, the user-defined constraints on the performance indicators are processed by the second term in the cost function J(Y) of Equation 3. For a constraint of the form $k_i\alpha_1 < c_i$, it is converted to the form $-c_i < -k_i\alpha_i$, where $k_i$ is the coefficient for the output property. Then, a method such as the logarithmic barrier function is applied to introduce the constraints as part of the cost function.

Turning back to Equation 2, if the estimated performance indicators $Y_{t+1}^*$ are improving compared to the prior performance indicators $Y_t$, then the cost function $J(Y_{t+1}^*)$ will be smaller than the cost function $J(Y_t)$ for the prior performance indicators. As such, the ratio a from Equation 2 will be greater than 1. Therefore, the performance checker 126 may determine whether the estimated performance indicators $Y_{t+1}^*$ have improved based on whether the ratio a from Equation 2 is greater than or less than 1. If the ratio a from Equation 2 is greater than 1, the performance checker 126 determines the estimated performance indicators $Y_{t+1}^*$ have improved relative to a prior configuration, and control proceeds to block 220 where the performance checker 126 saves the candidate configuration of parameters $\hat{X}_{t+1}$ and the associated estimated performance indicators $Y_{t+1}^*$. The performance checker 126 saves the candidate configuration of parameters $\hat{X}_{t+1}$ and the associated estimated performance indicators $Y_{t+1}^*$ in the candidate configuration memory 104 as a potential solution for the microarchitecture. As such, in some examples, a potential solution for the microarchitecture is identified and saved without performing a full simulation on the candidate configuration of parameters $\hat{X}_{t+1}$. In some examples, each candidate configuration of parameters that is accepted (by the performance checker 126 or the randomizer 128) is saved in the candidate configuration memory as a potential solution. In some examples, if a candidate configuration of parameters is repeated and analyzed twice, the results from the microarchitecture simulator 122 (if analyzed) will overwrite a prior solution of the candidate configuration of parameters not analyzed by the microarchitecture simulator 122 because the results from the microarchitecture simulator 122 are more accurate. In some such examples, the uncertainty values σ are also stored in the candidate configuration memory 104.

However, if the estimated performance indicators $Y_{t+1}^*$ have not improved, then the cost function $J(Y_{t+1}^*)$ is larger than the cost function $J(Y_t)$. In such an example, the ratio a from Equation 2 will be less than 1. Therefore, if the ratio a from Equation 2 is less than 1, the performance checker 118 determines the estimated performance indicators $T_{t+1}^*$ have not improved, and control proceeds to block 222.

At block 222, the randomizer 128 determines whether to accept or reject the candidate configuration of parameters $\hat{X}_{t+1}$ as a potential solution. This enables a potentially worse candidate configuration to be accepted (e.g., stored) and used as the basis for further candidate configurations to enable the performance indicators to move out of a local minimum (e.g., where some of the performance indicators satisfy the user-defined constraints and/or preferences while other performance indicators do not satisfy the user-defined constraints and/or preferences) and potentially find a better candidate configuration having better performance indicators (e.g., where all of the performance indicators satisfy the user-defined constraints and preferences). In some examples, the randomizer 128 implements a technique that randomly (e.g., based on a function to simulate, for example, a flip of a coin) accepts or rejects the candidate configuration of parameters $\hat{X}_{t+1}$. If the candidate configuration of parameters $\hat{X}_{t+1}$ is rejected, control proceeds back to block 208 and the proposal generator 108 samples the proposal distribution again and generates a new candidate configuration of parameters (e.g., a second candidate configuration of parameters) to be evaluated, and the process repeats. The new candidate configuration has a different combination of parameter values. In some examples, the proposal generator 108 may implement an algorithm (e.g., Metropolis-Hastings, Hybrid MC, Gibbs Sampling) for space exploration.

In some examples, the randomizer 128 decides to accept the candidate configuration of parameters, even if the estimate performance indicators $Y_{t+1}^*$ have not improved relative to the prior performance indicators from the prior candidate configuration. This results in potentially worse configurations being saved and used as a basis by the proposal generator 108 for the next configuration. However, this helps move the configurations out of a local minimum after multiple tries.

In some examples, to determine whether to accept or reject a candidate configuration of parameters, the randomizer 128 compares the ratio a from Equation 2 to a random number between 0 and 1 (e.g., rand(0,1)). Each time the randomizer 128 may randomly select a different number between 0 and 1. If the ratio a from Equation 2 exceeds the random number, for example, the candidate configuration of parameters is accepted ($X_{t+1}=\hat{X}_{t+1}$ and $Y_{t+1}=\hat{Y}_{t+1}$) and control proceeds to block 220. At block 220, the randomizer 128 or the performance checker 126 saves the candidate configuration as a potential solution in the candidate configuration memory 104.

If the ratio a from Equation 2 does not exceed the random number, the candidate configuration is rejected, and control proceeds back to block 208 and the proposal generator 108 generates the next (e.g., second) candidate configuration. In such an example, the next candidate configuration is not based on the current candidate configuration.

The iterative generation of proposals combined with the update rules form a Markov Chain where the current proposed parameters depend only on the parameters from the previous evaluated configuration. The fact that the proposed parameters are randomly sampled from a proposal distribution results in an optimization algorithm that is similar to Monte Carlo Markov Chain (MCMC) approaches. However, the function evaluated is not a likelihood but a cost function. One of the benefits of MCMC methods is that MCMC methods scale linearly with the dimensionality of the parameter space and, thus, it is more efficient that other sampling methods for high-dimensional spaces.

Figure 6:
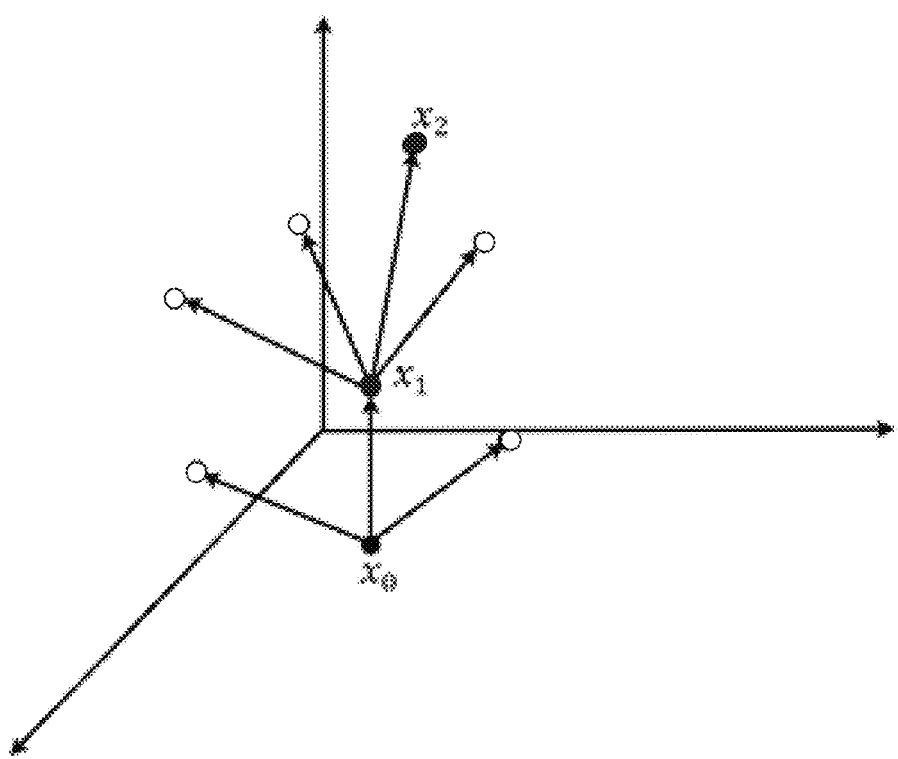
FIG. 6 illustrates example candidate configuration exploration that may be performed by the example system of FIG. 2.

Turning briefly to FIG. 6, FIG. 6 shows an example of a candidate configuration exploration using MCMC. Initial parameter values $x_i$ are used to generate the next parameter proposal by drawing a sample from the proposal distribution: $\hat{x}_1 \sim P(x_1|x_0)$. The proposal is accepted or rejected depending on the update rule and the process continues iteratively. The filled circles correspond to accepted proposals and empty circles correspond to rejected proposals.

In some examples, the operations of blocks 212, 214, and 222 are performed simultaneously or near simultaneously. An example pseudocode that may be executed to implement blocks 212, 214, and 222 is shown below:

```
a = J(Y_t)/J(Y_{t+1}*)
b = rand(0, 1)
```

$$u = \frac{1}{n}\sum_{i=0}^{n}\lambda_i\sigma_i$$

```
if a > b and u < τ:
return accept
if a <= b and u < τ:
return reject
return simulate
```

According to the pseudocode above, if the weighted average u is not below the uncertainty threshold τ, then a full simulation is to be performed on the candidate configuration (i.e., control proceeds to block 216). However, if the weighted average u is below the uncertainty threshold τ, the configuration is either rejected or accepted.

If the ratio a is larger than b (a random number between 0 and 1 (e.g., 0.8)), the candidate configuration is accepted and saved at block 220. As such, a candidate configuration that has improving performance indicators has a ratio a of greater than 1, which is accepted. Further, even if the ratio a is less than 1, the candidate configuration may still be accepted. For example, assume the ratio a is 0.9 (indicating the estimated performance indicators from the machine learning model 114 did not improve relative to the prior performance indicators), and assume b returns a value of 0.7, the candidate configuration is still accepted and saved at block 220. As disclosed above, this enables the process 200 to move the performance indicators out of a local minimum. If the ratio a is less than b, the candidate configuration is rejected and control proceeds back to block 208.

Although the pseudocode above is described in connection with the estimated performance indicators $Y_{t+1}*$ from the machine learning model 114, another pseudocode may be similarly implemented in connection with the performance indicators $Y_{t+1}$ from the microarchitecture simulator 122. For example, below is an example pseudocode that may be executed to implement blocks 214 and 222 when the performance indicators are from the microarchitecture simulator 122.

```
a = J(Y_t) / J(Y_{t+1})
b = rand (0,1)
if a > b:
    return accept
return reject
```

At block 224 of FIG. 2, the optimization checker 130 determines whether the candidate configuration of parameters $\hat{X}_{t+1}$ is an appropriate (e.g., optimal) solution. If not, control proceeds back to block 208, and the proposal generator 108 samples the proposal distribution again to generate the next candidate configuration of parameters, and the process repeats. In some examples, the optimization checker 130 determines the candidate configuration of parameters $\hat{X}_{t+1}$ is the appropriate (e.g., optimal) solution if the performance indicators satisfy all of the user-defined constraints and/or preferences. Additionally or alternatively, in some examples, the optimization checker 130 determines whether the candidate configuration of parameters $\hat{X}_{t+1}$ is the appropriate (e.g., optimal) solution based on the cost function. For example, if the candidate configuration of parameters $\hat{X}_{t+1}$ has the lowest cost function (of the all the candidate configurations tested so far and saved in the candidate configuration memory 104), the optimization checker 130 selects the candidate configuration as the final solution. If not, the process 200 is repeated. After numerous candidates configurations are evaluated, the results (e.g., the cost function and the performance indicators) converge toward a best configuration, i.e., an optimal solution.

In some examples, the system 100 tests a predetermined number of configurations (e.g., 10,000 configurations) and/or performs test for a predetermined period of time (e.g., 5 minutes). After the predetermined number of configurations have been tested and/or the predetermined time has lapsed, the optimization checker 130 selects the candidate configuration (from the potential solutions saved in the candidate configuration memory 104) with the lowest cost function and/or performance indicators closest to the user-defined preferences as the final solution. Additionally or alternatively, after a predetermined time (e.g., 5 minutes) and/or a predetermined number of tests (e.g., 10,000), the optimization checker 130 may present (via the input/output interface 102) the best candidate configurations (e.g., the 10 best configurations and their corresponding performance indicators) to the user and to allow the user to select the most desired candidate configuration. The system 100 may not necessarily identify the best or optimal solution from all possible configurations. Instead, the system 100 aims to find configurations that fulfill the user-defined constraints (i.e., feasible solutions or configurations) with some cost (e.g., determined by the cost function), and the system 100 selects or identifies the best or optimal (lowest cost) configuration from those feasible configurations found.

Once a candidate configuration is selected (either automatically or via user input) as the final (e.g., best available or optimal) solution, the HDL generator 132, at block 226, converts the candidate configuration to an HDL format, which can then be used to fabricate or manufacture the corresponding microarchitecture. In some examples, the HDL generator 132 creates an HDL file based on the selected candidate configuration of parameters. The HDL file can then be used to fabricate the microarchitecture. The example process 200 may be repeated again when a new microarchitecture is desired.

When first using the example system 100, the machine learning model 114 may be relatively untrained because the amount of training data is low. As such, the uncertainty values σ may be high. Therefore, in the beginning, most of the candidate configurations are tested using the full simulation in the microarchitecture simulator 122. Each time a full simulation is performed, new data (i.e., a candidate configuration (X) and its associated performance indicators (Y)) is produced that can be used as training data to retrain the machine learning model 114. Thus, as more candidate configurations are evaluated, more simulated results are obtained. After simulating a configuration in the microarchitecture simulator 122 one or more times, the machine learning model 114 may be retrained using the new data from the microarchitecture simulator 122. The training can be executed in parallel on, for example, a digital twin of the machine learning model 114 while the other copy of the machine learning model 114 continues to determine performance indicators. Therefore, in some examples, the learning process for the machine learning model 114 is carried out continuously while the system 100 operates. The BNN weight distributions' parameters are trained using the results from the full simulation, with a known backpropagation algorithm. Every time that the BNN distributions are updated, it is expected that the uncertainty values σ will decrease. As such, the accuracy of the machine learning model 114 greatly improves and the uncertainty levels decrease. Then after, the machine learning model 114 may be able to accurately predict the performance indicators with relatively low uncertainty levels. As such, the full simulation is not required, and the process 200 can quickly find an appropriate (e.g., best available or optimal) solution. In this manner, the process 200 can evaluate a large number of candidate configurations for a microarchitecture without having to perform a full simulation on each of the candidate configurations. This significantly reduces the time it takes to reach an optimized solution.

While in the illustrated example one microarchitecture simulator 122 is implemented, in other examples, multiple microarchitecture simulators may be used. The microarchitecture simulators may be arranged in parallel such that a number of candidate configurations can be simulated at the same time.

Figure 7:
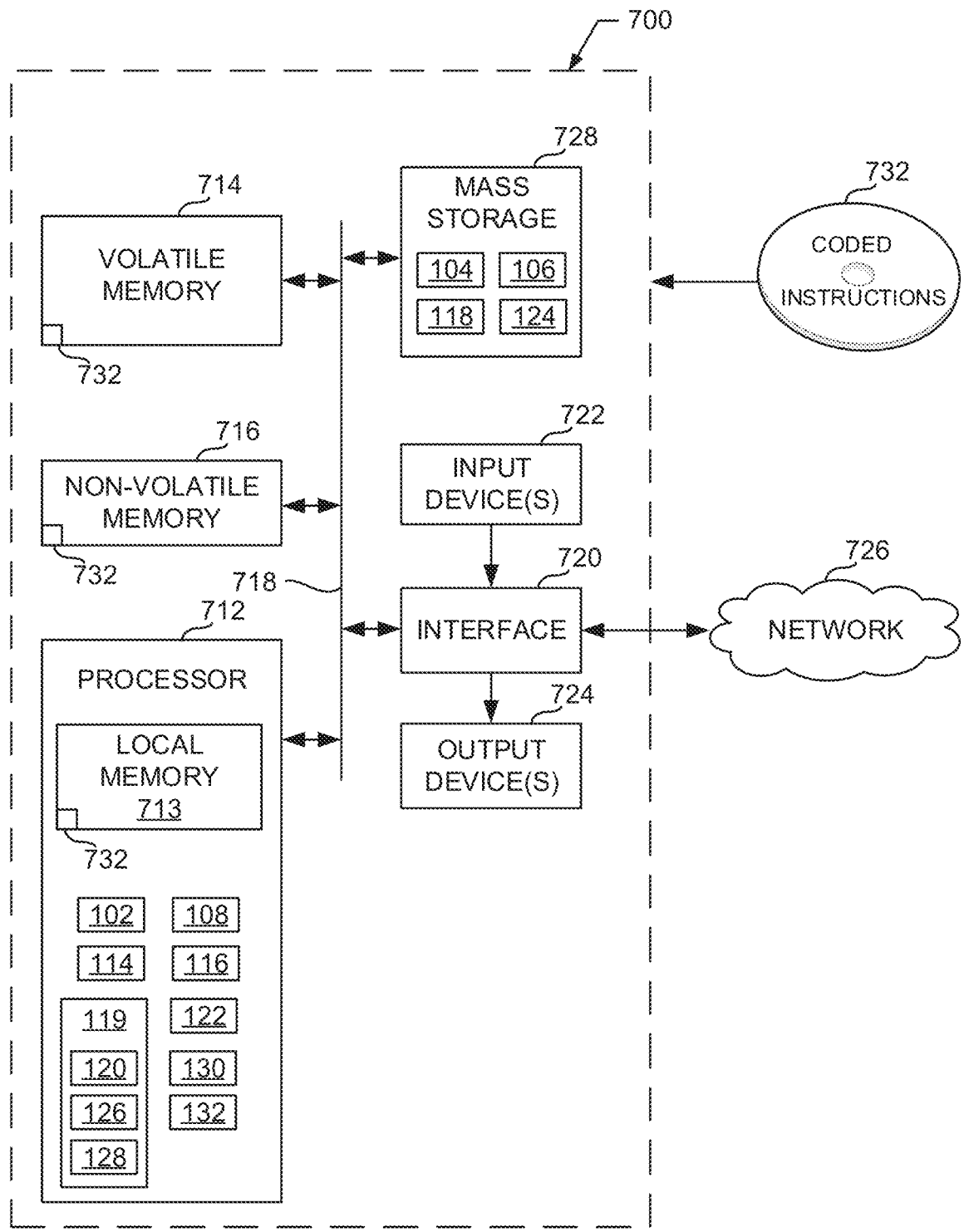
FIG. 7 is a block diagram of an example processing platform structured to execute the instructions of FIG. 2 to implement the example system of FIG. 1.

FIG. 7 is a block diagram of an example processor platform 700 structured to execute the instructions of FIG. 2 to implement the system 100 of FIG. 1. The processor platform 700 can be, for example, a server, a personal computer, a workstation, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input/output interface 102, the example proposal generator 108, the example fast approximation simulator/machine learning model 114, the example trainer 116, the example result evaluator 119, the example uncertainty checker 120, the example microarchitecture simulator 122, the example performance checker 126, the example randomizer 128, the example optimization checker 130, the example HDL generator 132.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data (e.g., input data such as user-defined constraints or preferences) and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, one or more of the candidate configuration memory 104, the microarchitecture database 106, the training data database 118, the workload and input data database 124 may be implemented by the mass storage devices 728.

The machine executable instructions 732 of FIG. 2 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus, systems, and articles of manufacture have been disclosed that improve the microarchitecture design process. Examples disclosed herein utilize a machine learning model to predict or approximate outputs from a full simulator. As such, numerous candidate configuration can be evaluated without having to fully simulate each of the candidate configurations, which significantly reduces the amount of time to locate a best available and/or optimal set of parameters for a microarchitecture of an electronic device. Examples disclosed herein solve the problem of slow microarchitecture simulations by utilizing machine learning to approximate a simulator to provide multiple candidate solutions (while simultaneously performing MCMC to model the cost function) to identify a best available and/or optimal configuration.

The following paragraphs provide various examples of the examples disclosed herein.

Example 1 includes a system to determine a configuration for a microarchitecture. The system includes a proposal generator to generate a first candidate configuration of parameters for the microarchitecture, a machine learning model to process the first candidate configuration of parameters to output estimated performance indicators for the microarchitecture, an uncertainty checker to determine whether the estimated performance indicators are reliable, and a performance checker to: in response to a determination that the estimated performance indicators are reliable, determine whether the estimated performance indicators have improved toward a target; and, if the estimated performance indicators have improved, store the first candidate configuration of parameters in a memory as a potential solution for the microarchitecture without performing a full simulation on the first candidate configuration of parameters.

Example 2 includes the system of Example 1, wherein the machine learning model further outputs uncertainty values associated with the estimated performance indicators, and the uncertainty checker is to determine whether the estimated performance indicators are reliable based on the uncertainty values.

Example 3 includes the system of Example 2, wherein the uncertainty checker is to determine whether the estimated performance indicators are reliable by: calculating a weighted average of the uncertainty values; and comparing the weighted average to a threshold.

Example 4 includes the system of any of Examples 1-3, wherein the target is based on at least one of a user-defined constraint or a user-defined preference.

Example 5 includes the system of any of Examples 1-4, wherein the performance checker is to determine whether the estimated performance indicators have improved based on a comparison of a cost function of the estimated performance indicators and a cost function of prior performance indicators associated with a prior candidate configuration of parameters.

Example 6 includes the system of any of Examples 1-5, further including a randomizer to, if the performance checker determines the estimated performance indicators have not improved, randomly reject or accept the first candidate configuration of parameters.

Example 7 includes the system of any of Examples 1-6, further including a microarchitecture simulator to, if the uncertainty checker determines the estimated performance indicators are not reliable, perform a full simulation on the first candidate configuration of parameters and to generate first performance indicators for the first candidate configuration of parameters.

Example 8 includes the system of Example 7, wherein the microarchitecture simulator is to save the first candidate configuration of parameters and the first performance indicators in a database to retrain the machine learning model.

Example 9 includes the system of Example 8, further including a trainer to retrain the machine learning model based on training data in the database.

Example 10 includes the system of any of Examples 1-9, wherein the machine learning model is a Bayesian Neural Network (BNN) model.

Example 11 includes the system of any of Examples 1-10, further including a hardware description language (HDL) generator to create an HDL file based on the first candidate configuration of parameters to be used to fabricate the microarchitecture.

Example 12 includes at least one non-transitory computer-readable medium including instructions that, when executed, cause at least one processor to at least: generate a first candidate configuration of parameters, execute a machine learning model with the first candidate configuration of parameters to generate estimated performance indicators, determine whether the estimated performance indicators are reliable, determine, in response to a determination that the estimated performance indicators are reliable, whether the estimated performance indicators have improved toward a target, and if the estimated performance indicators have improved, store the first candidate configuration of parameters as a potential solution for a microarchitecture without performing a full simulation on the first candidate configuration of parameters.

Example 13 includes the at least one non-transitory computer-readable medium of Example 12, wherein the instructions are to cause the at least one processor to output uncertainty values associated with the estimated performance indicators, and to determine whether the estimated performance indicators are reliable based on the uncertainty values.

Example 14 includes the at least one non-transitory computer-readable medium of Example 13, wherein, to determine whether the estimated performance indicators are reliable, the instructions, when executed, cause the at least one processor to: calculate a weighted average of the uncertainty values; and compare the weighted average to a threshold.

Example 15 includes the at least one non-transitory computer-readable medium of any of Examples 12-14, wherein the target is based on at least one of a user-defined constraint or a user-defined preference.

Example 16 includes the at least one non-transitory computer-readable medium of any of Examples 12-15, wherein, to determine whether the estimated performance indicators have improved, the instructions, when executed, cause the at least one processor to compare a cost function of the estimated performance indicators and a cost function of prior performance indicators associated with a prior candidate configuration of parameters.

Example 17 includes the at least one non-transitory computer-readable medium of any of Examples 12-16, wherein, if the estimated performance indicators have not improved, the instructions, when executed, cause the at least one processor to reject or accept the first candidate configuration of parameters based on a random function.

Example 18 includes the at least one non-transitory computer-readable medium of any of Examples 12-17, wherein, if the estimated performance indicators are not reliable, the instructions, when executed, cause the at least one processor to perform a full simulation on the first candidate configuration of parameters to generate first performance indicators for the first candidate configuration of parameters.

Example 19 includes the at least one non-transitory computer-readable medium of Example 18, wherein the instructions, when executed, cause the at least one processor to store the first candidate configuration of parameters and the first performance indicators in a database to retrain the machine learning model.

Example 20 includes the at least one non-transitory computer-readable medium of Example 19, wherein the instructions, when executed, cause the at least one processor to train the machine learning model based on training data in the database.

Example 21 includes the at least one non-transitory computer-readable medium of any of Examples 12-20, wherein the machine learning model is a Bayesian Neural Network (BNN) model.

Examples 22 includes the at least one non-transitory computer-readable medium of any of Examples 12-21, wherein the instructions, when executed, cause the at least one processor to create an HDL file based on the first candidate configuration of parameters to be used to fabricate a microarchitecture.

Example 23 includes a system for optimizing a configuration for a microarchitecture. The system includes means for generating a first candidate configuration of parameters, means for applying machine learning to the first candidate configuration of parameters to output estimated performance indicators, means for determining whether the estimated performance indicators are reliable, and means for determining whether the performance indicators have improved toward a target in response to a determination that the estimated performance indicators are reliable. If the estimated performance indicators have improved, the means for determining are to store the first candidate configuration of parameters in a memory as a potential solution for the microarchitecture without initiating a full simulation on the first candidate configuration of parameters.

Example 24 includes the system of Example 23, wherein the means for applying the machine learning outputs uncertainty values associated with the estimated performance indicators, and the means for determining whether the estimated performance indicators are reliable is to determine whether the estimated performance indicators are reliable based on the uncertainty values.

Example 25 includes the system of Example 24, wherein the means for determining whether the estimated performance indicators are reliable is to determine whether the estimated performance indicators are reliable by: calculating a weighted average of the uncertainty values; and comparing the weighted average to a threshold.

Example 26 includes the system of any of Examples 23-25, wherein the target is based on at least one of a user-defined constraint or a user-defined preference.

Example 27 includes the system of any of Examples 23-26, wherein the means for determining whether the estimated performance indicators have improved is to determine whether the estimated performance indicators are improving based on a comparison of a cost function of the estimated performance indicators and a cost function of prior performance indicators associated with a prior candidate configuration of parameters.

Example 28 includes the system of any of Examples 23-27, further means for accepting or rejecting the first candidate configuration of parameters, wherein, if the estimated performance indicators have not improved, the means for accepting or rejecting is to randomly reject or accept the first candidate configuration of parameters.

Example 29 includes the system of any of Examples 23-28, further including a microarchitecture simulator to, if the estimated performance indicators are not reliable, initiate a full simulation on the first candidate configuration of parameters and to generate first performance indicators for the first candidate configuration of parameters.

Example 30 the system of Example 29, wherein the microarchitecture simulator is to save the first candidate configuration of parameters and the first performance indicators in a database to retrain a machine learning model.

Example 31 includes the system of Example 30, further including means for training the machine learning model based on training data in the database.

Example 32 includes the system of any of Examples 23-31, wherein the machine learning model is a Bayesian Neural Network (BNN) model.

Example 33 includes the system of any of claims 23-32, further including means for creating an HDL file based on the first candidate configuration of parameters to be used to fabricate the microarchitecture.

Example 34 includes a method for optimizing a configuration for a microarchitecture. The method includes generating, by executing an instruction with a processor, a first candidate configuration of parameters, executing, by executing an instruction with the processor, a machine learning model with the first candidate configuration of parameters to generate estimated performance indicator, determining, by executing an instruction with the processor, whether the estimated performance indicators are reliable, determining, by executing an instruction with the processor, in response to a determination that the estimated performance indicators are reliable, whether the estimated performance indicators have improved toward a target, and, if the estimated performance indicators have improved, storing, by executing an instruction with the processor, the first candidate configuration of parameters as a potential solution for a microarchitecture without performing a full simulation on the first candidate configuration of parameters.

Example 35 includes the method of Example 34, wherein the executing of the machine learning model outputs uncertainty values associated with the estimated performance indicators, and wherein the determining of whether the estimated performance indicators are reliable is based on the uncertainty values.

Example 36 includes the method of Example 35, wherein the determining of whether the estimated performance indicators are reliable includes: calculating a weighted average of the uncertainty values; and comparing the weighted average to a threshold.

Example 37 includes the method of any of Example 34-36, wherein the target is based on at least one of a user-defined constraint or a user-defined preference.

Example 38 includes the method of any of Examples 34-37, wherein the determining of whether the estimated performance indicators have improved is based on comparison of a cost function of the estimated performance indicators and a cost function of prior performance indicators associated with a prior candidate configuration of parameters.

Example 39 includes the method of any of Examples 34-38, further including, if the estimated performance indicators have not improved, rejecting or accepting the first candidate configuration of parameters based on a random function.

Example 40 includes the method of any of Examples 34-39, further including, if the estimated performance indicators are not reliable, performing a full simulation on the first candidate configuration of parameters to generate first performance indicators for the first candidate configuration of parameters.

Example 41 includes the method of Example 40, further including storing the first candidate configuration of parameters and the first performance indicators in a database to retrain the machine learning model.

Example 42 includes the method of Example 41, further including training the machine learning model based on training data in the database.

Example 43 includes the method of any of Examples 34-42, wherein the machine learning model is a Bayesian Neural Network (BNN) model.

Example 44 includes the method of any of Examples 34-43, further including creating an HDL file based on the first candidate configuration of parameters to be used to fabricate a microarchitecture.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system to determine a configuration for a microarchitecture, the system comprising:
   a proposal generator to generate a first candidate configuration of parameters for the microarchitecture;
   a machine learning model to process the first candidate configuration of parameters to output estimated performance indicators for the microarchitecture;
   an uncertainty checker to determine whether the estimated performance indicators are reliable;
   a performance checker to:
      in response to a determination that the estimated performance indicators are reliable, determine whether the estimated performance indicators have improved toward a target; and
      if the estimated performance indicators have improved, store the first candidate configuration of parameters in a memory as a potential solution for the microarchitecture without performing a full simulation on the first candidate configuration of parameters;
   a microarchitecture simulator to, in response to a determination that the estimated performance indicators are not reliable, perform a full simulation using the first candidate configuration of parameters and generate first performance indicators for the first candidate configuration of parameters; and
   a hardware description language (HDL) generator to create an HDL file based on the first candidate configuration of parameters to be used to fabricate the microarchitecture.

2. The system of claim 1, wherein the machine learning model is further to output uncertainty values associated with the estimated performance indicators, and the uncertainty checker is to determine whether the estimated performance indicators are reliable based on the uncertainty values.

3. The system of claim 2, wherein the uncertainty checker is to determine whether the estimated performance indicators are reliable by:
   calculating a weighted average of the uncertainty values; and
   comparing the weighted average to a threshold.

4. The system of claim 1, wherein the target is based on at least one of a user-defined constraint or a user-defined preference.

5. The system of claim 1, wherein the performance checker is to determine whether the estimated performance indicators have improved based on a comparison of a cost function of the estimated performance indicators and a cost function of prior performance indicators associated with a prior candidate configuration of parameters.

6. The system of claim 1, further including a randomizer to, if the performance checker determines the estimated performance indicators have not improved, randomly reject or accept the first candidate configuration of parameters.

7. The system of claim 1, wherein the microarchitecture simulator is to save the first candidate configuration of parameters and the first performance indicators in a database to retrain the machine learning model.

8. The system of claim 7, further including a trainer to retrain the machine learning model based on training data in the database.

9. The system of claim 1, wherein the machine learning model is a Bayesian Neural Network (BNN) model.

10. At least one non-transitory computer-readable medium comprising instructions that, when executed, cause at least one processor to at least:
    generate a first candidate configuration of parameters;
    execute a machine learning model with the first candidate configuration of parameters to generate estimated performance indicators;
    determine whether the estimated performance indicators are reliable;
    determine, in response to a determination that the estimated performance indicators are reliable, whether the estimated performance indicators have improved toward a target;
    if the estimated performance indicators have improved, store the first candidate configuration of parameters as a potential solution for a microarchitecture without performing a full simulation on the first candidate configuration of parameters;
    if the estimated performance indicators are not reliable, perform a full simulation with the first candidate configuration of parameters to generate first performance indicators for the first candidate configuration of parameters; and
    create a hardware description language (HDL) file based on the first candidate configuration of parameters to be used to fabricate the microarchitecture.

11. The at least one non-transitory computer-readable medium of claim 10, wherein the instructions are to cause the at least one processor to output uncertainty values associated with the estimated performance indicators, and to determine whether the estimated performance indicators are reliable based on the uncertainty values.

12. The at least one non-transitory computer-readable medium of claim 11, wherein, to determine whether the estimated performance indicators are reliable, the instructions, when executed, cause the at least one processor to:
    calculate a weighted average of the uncertainty values; and
    compare the weighted average to a threshold.

13. The at least one non-transitory computer-readable medium of claim 10, wherein the instructions, when executed, cause the at least one processor to store the first candidate configuration of parameters and the first performance indicators in a database to retrain the machine learning model.

14. The at least one non-transitory computer-readable medium of claim 13, wherein the instructions, when executed, cause the at least one processor to train the machine learning model based on training data in the database.

15. A system for optimizing a configuration for a microarchitecture, the system comprising:
    means for generating a first candidate configuration of parameters;
    means for applying machine learning to the first candidate configuration of parameters to output estimated performance indicators;
    first means for determining whether the estimated performance indicators are reliable;
    second means for determining whether the performance indicators have improved toward a target in response to a determination that the estimated performance indicators are reliable, if the estimated performance indicators have improved, the second determining means is to store the first candidate configuration of parameters in a memory as a potential solution for the microarchitecture without initiating a full simulation on the first candidate configuration of parameters;

means for creating a hardware description language (HDL) file based on the first candidate configuration of parameters to be used to fabricate the microarchitecture; and means for accepting or rejecting the first candidate configuration of parameters, wherein, if the estimated performance indicators have not improved, the accepting or rejecting means is to randomly reject or accept the first candidate configuration of parameters.

16. The system of claim 15, wherein the applying means is to output uncertainty values associated with the estimated performance indicators, and the first determining means is to determine whether the estimated performance indicators are reliable based on the uncertainty values.

17. The system of claim 16, wherein the first determining means is to determine whether the estimated performance indicators are reliable by:

calculating a weighted average of the uncertainty values; and comparing the weighted average to a threshold.

18. A method for optimizing a configuration for a microarchitecture, the method comprising:

generating, by executing an instruction with a processor, a first candidate configuration of parameters;

executing, by executing an instruction with the processor, a machine learning model with the first candidate configuration of parameters to generate estimated performance indicators;

determining, by executing an instruction with the processor, whether the estimated performance indicators are reliable;

determining, by executing an instruction with the processor, in response to a determination that the estimated performance indicators are reliable, whether the estimated performance indicators have improved toward a target;

if the estimated performance indicators have improved, storing, by executing an instruction with the processor, the first candidate configuration of parameters as a potential solution for the microarchitecture without performing a full simulation on the first candidate configuration of parameters;

performing, by executing an instruction with the processor, in response to a determination that the estimated performance indicators are not reliable, a full simulation based on the first candidate configuration of parameters to generate first performance indicators for the first candidate configuration of parameters; and creating, by executing an instruction with the processor, a hardware description language (HDL) file based on the first candidate configuration of parameters to be used to fabricate the microarchitecture.

19. The method of claim 18, further including, if the estimated performance indicators have not improved, rejecting or accepting the first candidate configuration of parameters based on a random function.

20. The method of claim 18, wherein the machine learning model is a Bayesian Neural Network (BNN) model.

* * * * *